(12) United States Patent
Adimatyam et al.

(10) Patent No.: US 8,793,729 B2
(45) Date of Patent: Jul. 29, 2014

(54) PREFERENTIAL PROGRAM GUIDE

(75) Inventors: Venkata S. Adimatyam, Irving, TX (US); Sameer Vasant Gavade, Irving, TX (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 160 days.

(21) Appl. No.: 12/750,920

(22) Filed: Mar. 31, 2010

(65) Prior Publication Data
US 2011/0247036 A1    Oct. 6, 2011

(51) Int. Cl.
*G06F 3/00* (2006.01)
(52) U.S. Cl.
USPC .......................................................... 725/40
(58) Field of Classification Search
CPC .................................................. H04N 5/44543
USPC ............................................... 725/40, 46, 87
See application file for complete search history.

(56) References Cited

U.S. PATENT DOCUMENTS

| 8,533,761 | B1 * | 9/2013 | Sahami et al. | 725/53 |
| 2004/0001081 | A1 * | 1/2004 | Marsh | 345/721 |
| 2006/0161952 | A1 * | 7/2006 | Herz et al. | 725/46 |
| 2007/0044122 | A1 * | 2/2007 | Scholl et al. | 725/46 |
| 2007/0055994 | A1 * | 3/2007 | Orihara | 725/46 |
| 2008/0263596 | A1 * | 10/2008 | Kim et al. | 725/40 |
| 2009/0320072 | A1 * | 12/2009 | McClanahan et al. | 725/47 |
| 2010/0333142 | A1 * | 12/2010 | Busse et al. | 725/47 |

FOREIGN PATENT DOCUMENTS

EP    1387583 A1 *    2/2004

* cited by examiner

*Primary Examiner* — Nathan Flynn
*Assistant Examiner* — Alfonso Castro

(57) ABSTRACT

A method may include selecting a plurality programs to recommend to a user based on preferences of the user. The method may include displaying a program guide including a timeline, wherein the program guide indicates times that the plurality of recommended programs are scheduled to play. The program guide may also include a gap between the displayed recommended programs, the gap indicating a time during which one or more programs not selected to recommend to the user is scheduled to play. In one embodiment, the method may include displaying a video on demand (VOD) program or a personal video recorder (PVR) program in the gap between the displayed recommended programs.

25 Claims, 14 Drawing Sheets

200

METADATA TABLE 406

| CONTENT ID 602 | TITLE 604 | GENRE 606 | PLOT 608 | DIRECTOR 610 | CAST 612 |
|---|---|---|---|---|---|
| 0381061 | E.R. | Drama, Medical | An American medical drama series set primarily in the emergency room of fictional County General Hospital in Chicago, Illinois. | Christopher Chulack | Parminder Nagra (Neela Rasgotra), Linda Cardellini (Samantha Taggart), Shane West (Ray Barnett), Scott Grimes (Archie Morris) |
| 0246460 | Die Another Day | Action, Adventure, Thriller | James Bond is sent to investigate the connection between a North Korean terrorist and a diamond mogul who is funding development of an international space weapon. Bond travels to Iceland where he experiences the power of the terrorist's new space weapon. | Lee Tamahori | Pierce Brosnan (James Bond), Halle Berry (Jinx), Toby Stephens (Gustav Graves), Rosamund Pike (Miranda Frost), Judi Dench (M) |
| 1139664 | Quantum of Solace | Animation, Adventure, Comedy, Family | Picking up after Casino Royale, James Bond tracks a traitor who's infiltrated Britain's MI6. Bond discovers that the trail leads to the charismatic head of a world environmental agency, which turns out to be a terrorist organization. | Andrew Adamson, Vicky Jenson | Daniel Craig (James Bond), Olga Kurylenko (Camille), Judi Dench (M) |
| ••• | ••• | ••• | ••• | ••• | ••• |

CORRELATION TABLE 408

| FIRST CONTENT ID 702 | SECOND CONTENT ID 704 | CORRELATION SCORE 706 | |
|---|---|---|---|
| 0381061 | 0246460 | 50 | 752-1 |
| 1139664 | 0546683 | 26 | 752-2 |
| 0381061 | 0546683 | 32 | 752-3 |
| 0381061 | 1139664 | 52 | 752-4 |
| 0246460 | 0546683 | 12 | 752-5 |
| 0246460 | 1139664 | 15 | 752-6 |
| ... | ... | ... | |

FIG. 7

| PROFILE HISTORY TABLE 412 | | | | |
|---|---|---|---|---|
| PROFILE ID 902 | CONTENT ID 904 | DATE 906 | START TIME 908 | STOP TIME 910 |
| 56945 | 0246467 | 2010-03-05 | 17:00 | 17:30 |
| 68297, "parents" | 0246467 | 2010-03-05 | 17:15 | 17:30 |
| 59678 | 0246460 | 2010-03-05 | 17:15 | 17:30 |
| 59678 | 0246460 | 2010-03-05 | 17:30 | 18:00 |
| ... | ... | ... | ... | ... |

952-1, 952-2, 952-3, 952-4

PREFERENTIAL PROGRAM GUIDE

BACKGROUND INFORMATION

Television viewers have access to an ever-growing amount and variety of content. For example, a viewer may choose between broadcast television programs, pay-per-view programs, on-demand programs, interactive games, or music. The large amount of content can make it difficult for the viewer to find and select desired content. Some content providers offer on-screen program guides to assist viewers in finding content.

BRIEF DESCRIPTION OF THE DRAWINGS

FIG. 6 is a diagram of an exemplary metadata table;

FIG. 7 is a diagram of an exemplary correlation table;

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Typical on-screen program guides may help viewers find content, but as the amount of content continues to expand, even the typical on-screen program guides are inadequate. One or more embodiments disclosed herein allow for content to be recommended to a television viewer (e.g., a user). The recommended content may be based on the user's viewing history or preferences, for example. One embodiment may display a listing of recommended content as a preferential program guide, which may display the recommended content without the clutter associated with content that the viewer is less likely to enjoy.

Figure 1:
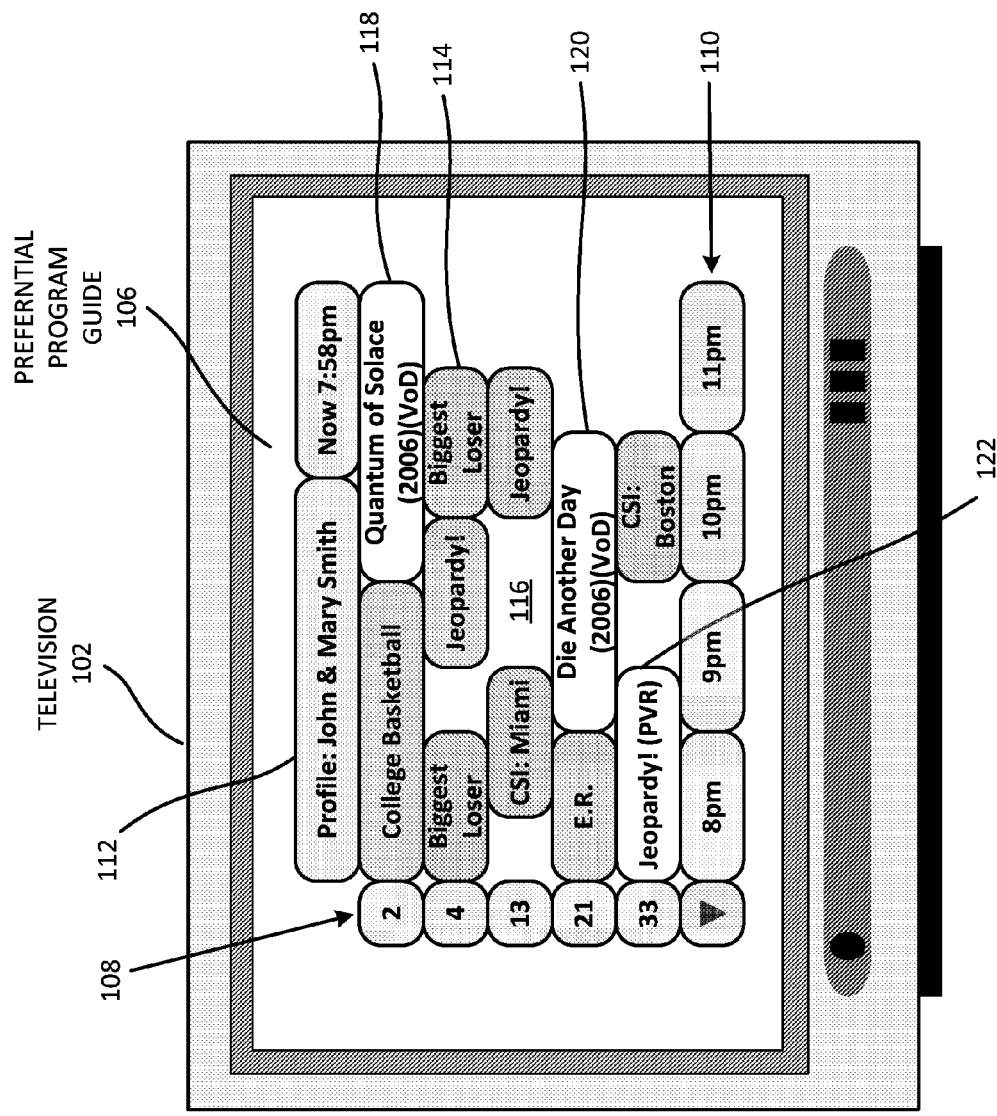
FIG. 1 is a diagram of an overview of an exemplary embodiment described herein.

FIG. 1 is a diagram of an overview of an exemplary embodiment. The embodiment of FIG. 1 includes a television (TV) 102 in a customer's home. TV 102 includes a display, which displays a preferential program guide (PPG) 106 showing recommended or preferred content for a user or group of users (e.g., John and Mary Smith identified in graphical widget 112).

PPG 106 may include a channel list 108 and a timeline 110. Channel list 108 and timeline 110 may allow for PPG 106 to display recommended content scheduled to play on a channel at a particular time (e.g., program 114 titled "Biggest Loser" playing at 10:30 pm). As shown in the embodiment of FIG. 1, each channel may include a timeline (e.g., a timeline for channel 2, a timeline for channel 4, etc). This embodiment may include time gaps between recommended scheduled programs (e.g., time gap 116) where non-recommended programs may be scheduled. Further, this embodiment may include channel gaps between channels carrying recommended programs (e.g., missing channel 5) where the excluded channel does not carry recommended content.

In one embodiment, time gaps may be filled with non-scheduled content such as video-on-demand (VOD) content or content stored in a personal video recorder (PVR). For example, the PPG 106 includes VOD movies 118 and 120 (e.g., "Quantum of Solace" and "Die Another Day") on channel 2 at 10 pm and on channel 21 at 9 pm. VOD movies 118 and 120 may occupy, mask, or cover the times and/or channels for non-recommended content. In addition, PPG 106 includes PVR program 122 (e.g., "Jeopardy!") on channel 33 at 8 pm that occupies the time and channel for non-recommended content. In this embodiment, VOD and PVR content may be labeled and may be a different color than scheduled content.

Figure 2:
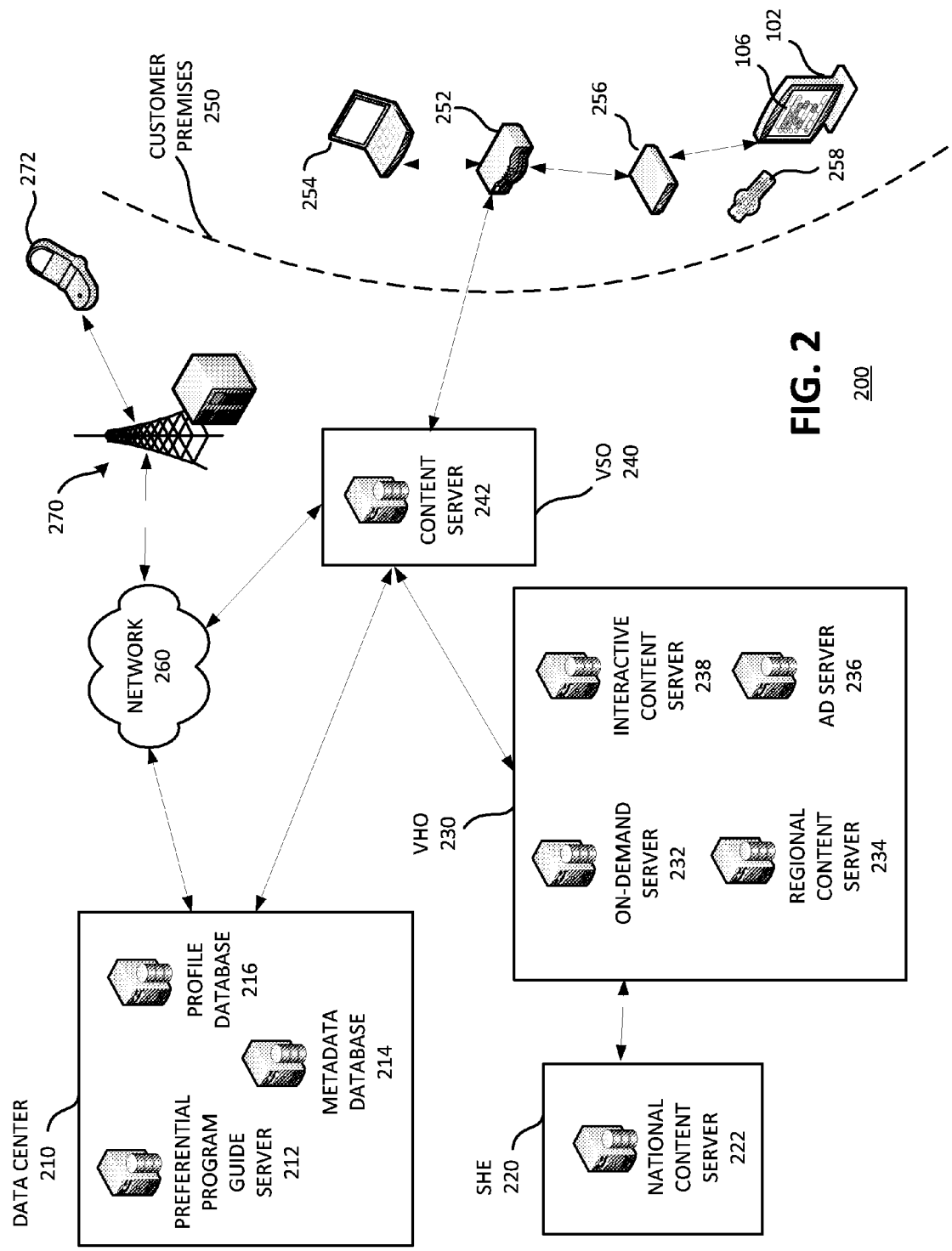
FIG. 2 is a diagram of an exemplary network for implementing embodiments described herein.

FIG. 2 is a diagram of an exemplary network 200 for implementing embodiments described herein. Network 200 may include a data center 210, a super head end (SHE) 220, a video hub office (VHO) 230, a video service office (VSO) 240, customer premises 250, a network 260, a base station system (BSS) 270, and a mobile device 272.

As with FIG. 1, customer premises 250 (e.g., the customer's home) includes TV 102 with a display showing PPG 106. Customer premises 250 may also include an optical network terminal (ONT) 252, a set-top box (STB) 256, a computer 254, and a remote control 258. ONT 252 may receive data, e.g., on a fiber optic cable, and may transfer the data to the appropriate device in customer premises 250, such as a telephone (not shown), computer 254, or STB 256. Likewise, ONT 252 may receive data from any device in customer premises 250 and may transmit the data to other devices in network 200, e.g., through a fiber optic cable.

STB 256 may receive content through content server 242, for example, and output the content to TV 102 for display. In one embodiment STB 256 may include the functionality of a PVR for time-shifting recorded content. In one embodiment, STB 256 may include a radio frequency identifying (RFID) component for identifying devices that surround STB 256. STB 256 may include a component (e.g., a cable card or a software package) that plugs into a host device (e.g., a PVR, a personal computer, television 102, a stereo system, etc.) that allows the host device to display content. STB 256 may also be implemented as a home theater personal computer (HTPC), an optical disk player (e.g., digital video disk (DVD) or Blu-Ray (™) disc player), a cable card, etc. STB 256 may receive commands from other components in network 200 (e.g., remote control 258).

Remote control 258 may issue wired or wireless commands for controlling other electronic devices, such as TV 102 or STB 256. Remote control 258, in conjunction with STB 256, may allow a user to manually select programs for viewing on TV 102. In one embodiment, remote control 258 may be used in conjunction with STB 256 to record or watch content having been recommended in a preferential program guide (e.g., PPG 106), for example. Other types of devices (e.g., a keyboard, mouse, mobile phone 272, etc.) may be used instead of remote control 258.

TV 102 may include speakers as well as a display. TV 102 may play content, for example, received through VSO 240 or from a PVR (e.g., a PVR in STB 256). While some disclosed embodiment may use TV 102, other embodiments may play content using any device (e.g., computer 254 or mobile phone 272) capable of receiving and displaying content, for example.

Customer premises 250 may connect to VSO 240. VSO 240 may collect and deliver content (e.g., PPG 106 and selected programs) to customer premises 250 and may receive data from customer premises 250 for forwarding to the proper destination (e.g., network 260, or any device in network 200). VSO 240 may include a content server 242. Content server 242 may include a content mixing engine (e.g., a multiplexer/demultiplexer) to select information, such as on-demand content, regional and national video content, interactive content, and/or advertising content, and mix the information together. Content server 242 may also perform transcoding of the mixed information and/or encoding or encryption functions.

Data center 210 may include components that manage and/or store information associated with providing a preferential program guide. As shown in FIG. 2, data center 210 may include a preferential program guide (PPG) server 212, a metadata database 214, and a profile database 216.

Metadata database 214 may include a server that stores information about content. For a video, for example, metadata database 214 may store the title, genre, plot, director, cast, etc., of the video. Metadata database 214 may also store information about content other than videos, such as interactive games or music. As used herein, the term "program" or "content" may refer to any type of content, such as TV programs, movies, interactive games, audio content, radio content, etc. PPG server 212 may use metadata database 214 to determine which content correlates well with other content and, based on the correlations, may recommend programs for a user or group of users, for example, by generating a preferential program guide (e.g., PPG 106).

Profile database 216 may include a server that stores information about user preferences, preferences of a group of users, or other information to determine such preferences. For example, profile database 216 may include metadata associated with programs previously viewed by a user or group of users. As another example, profile database 216 may store information about the types of programs a user or a group of users prefers.

SHE 220 may include a national content server 222. National content server 222 may include a source of for-pay television broadcasts (e.g., TNT, ESPN, HBO, Cinemax, CNN, etc.). VHO 230 may include an on-demand server 232, a regional content server 234, an advertisement (ad) server 236, and an interactive content server 238. Regional content server 234 may provide television broadcasts (e.g., local broadcasts, such as NBC, CBS, ABC, Fox, local cable access channels, etc.). On-demand server 232 may provide on-demand content. Ad server 236 may provide and/or manage the advertising content (e.g., commercials) that is presented with other content. Interactive content server 238 may serve and manage interactive content (e.g., a form of content with which a user can interact). For example, interactive content may include an interactive program guide (e.g., PPG 106), an interactive game, or interactive advertisements.

Network 260 may include one or more packet switched networks, such as an Internet protocol (IP) based network, a local area network (LAN), a wide area network (WAN), a personal area network (PAN), an intranet, the Internet, or another type of network that is capable of transmitting data. Network 260 may include a circuit-switched network, such as a public-switched telephone network (PSTN) for providing telephone services for traditional telephones. Network 260, in conjunction with components in VSO 240, may allow devices at customer premises 250 (e.g., a computer or a set-top box) to connect to other devices also attached to network 260, such as third party web site servers (not shown) or other customers (not shown).

BSS 270 may control traffic and signaling with a mobile device. BSS 270 may include an antenna to transmit and receive signals to and from a mobile device, such as mobile device 272. Mobile device 272 may include a radiotelephone, a personal communications system (PCS) terminal, a personal digital assistant (PDA), a laptop, or another portable communication device. In one embodiment, mobile device 272 may include an RFID component for identifying the device.

The exemplary configuration of devices in network 200 is illustrated for simplicity. Network 200 may include more devices, fewer devices, or a different configuration of devices than illustrated in FIG. 2. For example, network 200 may include thousands or millions of customer homes. In some embodiments, the functions performed by two or more devices may be performed by any one device. Likewise, in some embodiments, the functions performed by any one device may be performed multiple devices. Further, the connections shown in FIG. 2 are exemplary. In other embodiments, additional connections that are not shown in FIG. 2 may exist between devices (e.g., each device may be connected to every other device). The connections in FIG. 2 may also be wireless or wired.

Figure 3:
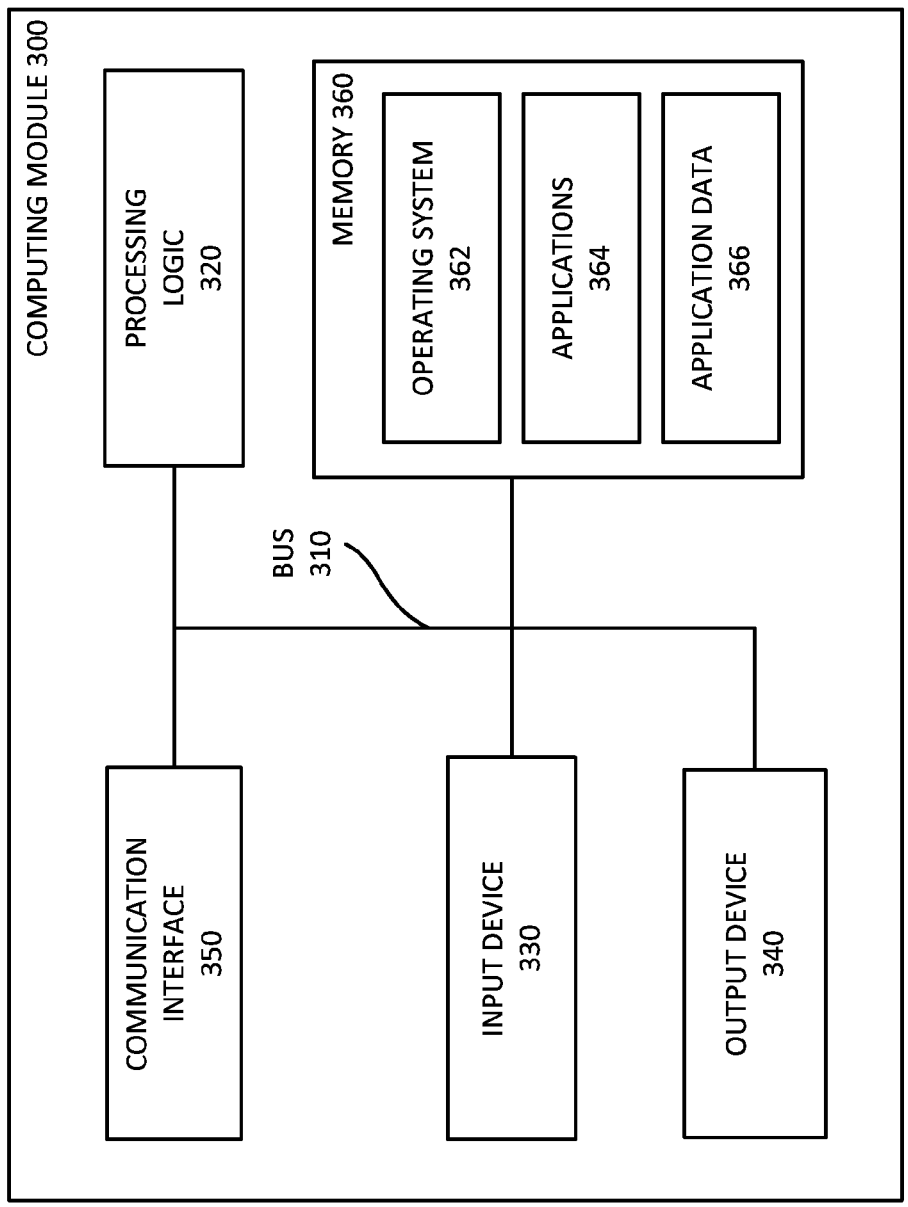
FIG. 3 is a block diagram of exemplary components of a computing module.

Devices in network 200 may each include one or more computing modules. FIG. 3 is a block diagram of exemplary components of a computing module 300. Computing module 300 may include a bus 310, processing logic 320, an input device 330, an output device 340, a communication interface 350, and a memory 360. Computing module 300 may include other components (not shown) that aid in receiving, transmitting, and/or processing data. Moreover, other configurations of components in computing module 300 are possible.

Bus 310 may include a path that permits communication among the components of computing module 300. Processing logic 320 may include any type of processor or microprocessor (or families of processors or microprocessors) that interprets and executes instructions. In other embodiments, processing logic 320 may include an application-specific integrated circuit (ASIC), a field-programmable gate array (FPGA), or the like.

Input device 330 may allow a user to input information into computing module 300. Input device 330 may include a keyboard, a mouse, a pen, a microphone, a remote control (e.g., remote control 258), a touch-screen display, etc. Some devices, such as servers 232-238, may be managed remotely and may not include input device 330. In other words, some devices may be "headless" and may not include a keyboard, for example.

Output device 340 may output information to the user. Output device 340 may include a display, a printer, a speaker, etc. For example, TV 102 includes a display (an output device), which may include a liquid-crystal display (LCD) for displaying content to the user. As another example, ONT 252 and STB 256 may include light-emitting diodes (LEDs).

Headless devices, such as servers 212-242, may be managed remotely and may not include output device 340.

Input device 330 and output device 340 may allow the user to activate and interact with a particular service or application, such as a preferential program guide (e.g., PPG 106). Input device 330 and output device 340 may allow the user to receive and view a menu of options and select from the menu options. The menu may allow the user to select various functions or services associated with applications executed by computing module 300.

Communication interface 350 may include a transceiver that enables computing module 300 to communicate with other devices and/or systems. Communication interface 350 may include a transmitter that may convert baseband signals to radio frequency (RF) signals and/or a receiver that may convert RF signals to baseband signals. Communication interface 350 may be coupled to an antenna for transmitting and receiving RF signals. Communication interface 350 may include a network interface card, e.g., Ethernet card, for wired communications or a wireless network interface (e.g., a WiFi) card for wireless communications. Communication interface 350 may also include, for example, a universal serial bus (USB) port for communications over a cable, a Bluetooth™ wireless interface, an RFD) interface, a near-field communications (NFC) wireless interface, etc.

Memory 360 may store, among other things, information and instructions (e.g., applications 364 and operating system (OS) 362) and data (e.g., application data 366) for use by processing logic 320. Memory 360 may include a random access memory (RAM) or another type of dynamic storage device; a read-only memory (ROM) device or another type of static storage device; and/or some other type of magnetic or optical recording medium and its corresponding drive (e.g., a hard disk drive (HDD)).

OS 362 may include software instructions for managing hardware and software resources of computing module 300. For example, OS 362 may include Linux, Windows, OS X, an embedded operating system, etc. Applications 364 and application data 366 may provide network services or include applications, depending on the device in which the particular computing module 300 is found.

Computing module 300 may perform the operations described herein in response to processing logic 320 executing software instructions contained in a computer-readable medium, such as memory 360. A computer-readable medium include a physical or logical memory device. The software instructions may be read into memory 360 from another computer-readable medium or from another device via communication interface 350. The software instructions contained in memory 360 may cause processing logic 320 to perform processes that are described herein.

Figure 4:
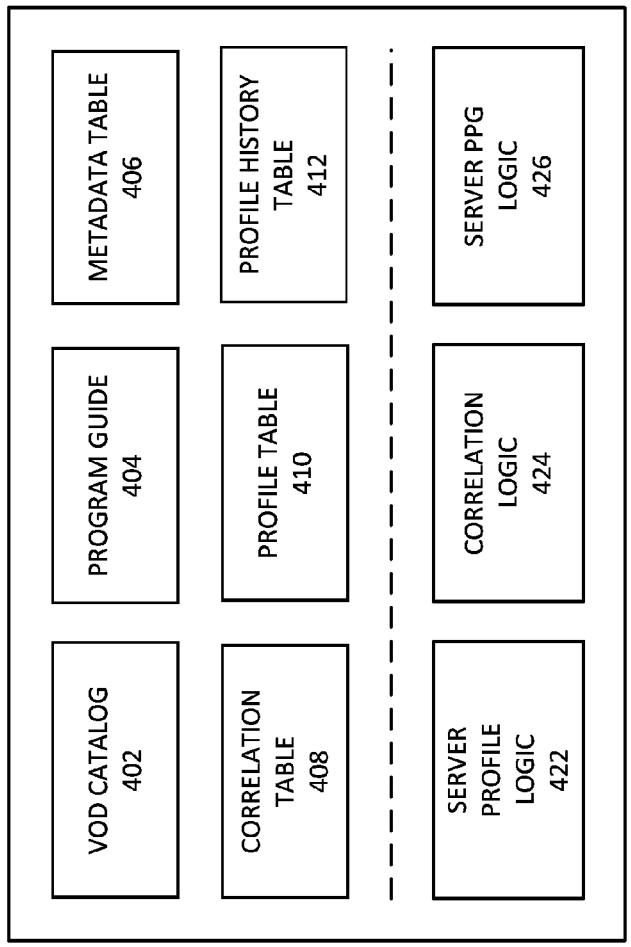
FIG. 4 is a block diagram of exemplary components of the preferential program guide server of FIG. 2.

As discussed above, PPG server 212 may use metadata database 214 to determine which content correlates well other content and, based on the correlations, may recommend programs for a user or group of users by generating a preferential program guide (e.g., PPG 106). FIG. 4 is a block diagram of exemplary components of PPG server 212 (e.g., functions performed by application 364 in processing logic 320 or stored in memory 360 of PPG server 212). PPG server 212 may store a video-on-demand (VOD) catalog 402, a program guide 404, a metadata table 406, a correlation table 408, a profile table 410, and a profile history table 412. PPG server 212 may also include server profile logic 422, correlation logic 424, and server preferential programming guide (PPG) logic 426. Some components shown in FIG. 4 may also be stored in other devices in network 200, for example.

VOD catalog 402 may identify content stored in on-demand server 232, for example, for delivery to STB 256. Program guide 404 may identify the content, broadcast times, and channels associated with content, such as content stored in regional content server 234 or national content server 222. VOD catalog 402 and/or program guide 404 may also or alternatively be stored in other devices in network 200, such as on-demand server 232.

Metadata table 406 may store information about content (e.g., content provided by content servers 222-238), such as the title, genre, plot, cast, etc., of the content. Information from metadata table 406 may be used for correlating and recommending preferred content. Metadata table 406 may also be stored in metadata database 214 and retrieved by PPG server 212 from metadata database 214.

FIG. 6 is a diagram of exemplary metadata table 406. Each record (e.g., entry) in metadata table 406 may be associated with a different piece of content. Metadata table 406 may include a content ID field 602, a title field 604, a genre field 606, a plot field 608, a director field 610, and a cast field 612.

Content ID field 602 may include a value identifying a piece of content stored in a content server, such content servers 222-238. In one embodiment, content ID field 602 may uniquely identify the content. Record 652-1 of metadata table 406, for example, includes a content ID of 0381061 in content ID field 602.

Title field 604 may include the title of the associated content. For example, record 652-1 of metadata table 406 includes a title of "E.R." in title field 604. Genre field 606 may include a list of categories describing the content. Examples of genre include "action," "adventure," "thriller," "sci-fi," "comedy," "romantic," etc. Record 652-1 of metadata table 406 includes the following list of genres in genre field 606: drama and medical.

Plot field 608 may include a description of the plot of the associated content. For example, record 652-1 includes the following plot in plot field 608: "An American medical drama series set primarily in the emergency room of fictional County General Hospital in Chicago, Ill."

Director field 610 may include a list of names of the directors of the associated content. Record 652-1 of metadata table 406 includes the following list of names (e.g., a single name) in director field 606: Christopher Chulack. Cast field 612 may include a list of names of the actors (and character played) that appear in the associated content. Record 652-1 of metadata table 406 includes the following list of names (with character played in parentheses) in cast field 612: Parminder Nagra (Neela Rasgotra), Linda Cardellini (Samantha Taggart), Shane West (Ray Barnett), and Scott Grimes (Archie Morris).

Metadata table 406 may include additional, different, or fewer fields than illustrated in FIG. 6. For example, metadata table 406 may also include keyword fields that may store keywords (e.g., the more relevant information) from the other fields. Such keyword fields may be used for correlating two pieces of content, for example. Metadata table 406 may include a content-type field indicating the type of content (e.g., a movie, an interactive game, a TV program, etc.). Metadata table 406 may also include a channel field with the name or number of the channel that a piece of content is associated with (e.g., The History Channel, Discovery Channel, etc. etc.). As another example, metadata table 406 may include a date field indicating the date that the content was released to the public or the date that the content will be replayed. In other embodiments, metadata table 406 may be stored in any other device in network 200, such as STB 256 or content servers 222-238 (e.g., in memory 360).

Returning to FIG. 4, correlation table 408 may store information related to the degree of similarity between content. FIG. 7 is a diagram of an exemplary correlation table 408. Correlation table 408 may store information related to the similarities between (e.g., the correlation of) different content. Each record (e.g., entry) in correlation table 408 may be associated with a pair of content. Correlation table 408 may include a first content ID field 702, a second content ID field 704, and a correlation score field 706 ("score field 706").

First content ID field 702 may include a value (e.g., a unique value) identifying a piece of content stored in a content server. For example, record 752-1 includes a content ID of 0381061 in first content ID field 702 (which corresponds to record 652-1 in metadata table 406). Second content ID field 704 may also include a value (e.g., a unique value) identifying a piece of content stored in a content server. For example, record 752-1 includes a second content ID of 0246460 in second content ID field 702 (which corresponds to record 652-2 in metadata table 406).

Score field 706 may include a value indicating the relative similarities between the content identified in first content ID field 702 and the content identified in second content ID field 704. In one embodiment, the higher the score, the more the pieces of content are considered to be similar or correlated, for example. The values in score field 706 may be generated, for example, by correlation logic 424 described below.

As shown in record 752-1 of exemplary correlation table 408, the content with the ID of 0381061 (e.g., "ER") and the content with the ID of 0246460 (e.g., "Die Another Day") have a correlation score of 50. As shown in record 752-4 of correlation table 408, the content with the ID of 0381061 and the content with the ID of 1139664 have a correlation score of 52. In the example where higher scores indicate more similar content, the content pair in record 752-4 is considered more similar than the content pair in record 752-1 because the correlation score in score field 706 is higher in record 752-4 than in record 752-1.

Correlation table 408 may include additional, different, or fewer fields than illustrated in FIG. 7. For example, correlation table 408 may include additional fields for correlation scores calculated using different algorithms. In other embodiments, correlation table 408 may be stored in any other device in network 200, such as in STB 256 or content servers 222-238 (e.g., in memory 360).

Returning to FIG. 4, profile table 410 may store information related to user profiles. In some embodiments, a user or a group of users may be associated with a profile, which may be used to track preferences and viewing history for the corresponding user or users. A profile may store a profile identifier, the users associated with the profile, and the type of profile (e.g., child, adult, family, etc.). In other embodiments, profile table 410 may be stored in any other device in network 200, such as in STB 256 or content servers 222-238 (e.g., in memory 360).

Figure 8:
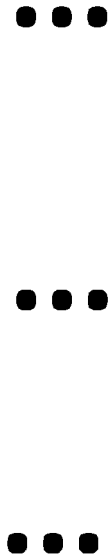
FIG. 8 is a diagram of an exemplary profile table.

FIG. 8 is a diagram of exemplary profile table 410. Profile table 410 may store information related to users or groups of users. Profile table 410 may include a profile ID field 802, a user ID field 804, and a profile tag field 806. Profile table 410 may include additional, different, or fewer fields than illustrated in FIG. 8. Each record (e.g., entry) in profile table 410 may be associated with one profile, for example.

Profile ID field 802 may include a value (e.g., a unique value) identifying a profile for storing preferences of a user or users. For example, record 852-1 includes a profile ID of 56945 in profile ID field 802. Profile ID field 802 may also include a name associated with the profile. For example, the profile with the ID of 56927 includes the name "family." The profile with the ID of 68297 includes the name "parents." The profile with the ID of 98562 includes the name "kids."

User ID field 804 may indicate one or more users associated with the corresponding profile. For example, the profile with the profile ID of 56945 is associated with John Smith. As another example, the profile with the ID 98562 is associated with two users: Jane Smith and Martin Smith.

Profile tag field 806 may indicate characteristics of the corresponding profile identified in profile ID field 802. Examples of profile tags include "adult," "child," "family," "history," "biography," "action." A child profile may, for example, be associated with children and may be limited to content appropriate for children. An adult profile, on the other hand, may be associated with adults and content appropriate for adults. A family profile may be associated with children and adults, for example, and may be associated with content enjoyable and appropriate for both adults and children.

Figure 9:
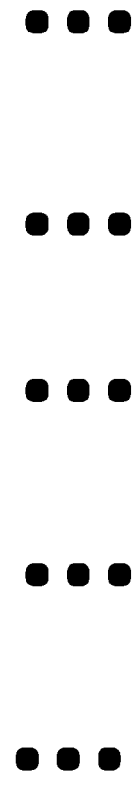
FIG. 9 is a diagram of an exemplary profile history table.

Returning to FIG. 4, profile history table 412 may store the history of content viewed or experienced by the user or users (e.g., on TV 102 or another user device) associated with a profile, for example. FIG. 9 is a diagram of an exemplary profile history table 412. Each record 952-x may store details of a period of viewing activity for the corresponding profile. Profile history table 412 may also be stored in profile database 216, STB 256, or any other device in network 200. Exemplary profile history table 412 includes a number of records 952-1 through 952-4.

Profile history table 412 may include a profile ID field 902, a content ID field 904, a date field 906, a start time field 908, and a stop time field 910. The fields in profile history table 412 are exemplary. Profile history table 412 may include fewer, more, or different fields than shown in FIG. 9.

Profile ID field 902 may store information identifying the profile to which the remaining data in the entry corresponds. For example, entry 952-1 includes a profile ID of 56945, which corresponds to the profile for John Smith (e.g., see profile table 410 in FIG. 8). Thus, the information in fields 904 through 910 correspond to John Smith's profile. Other profiles identified in profile history table 412 include the profiles with the IDs of 68297 and 59678.

Content ID field 904 may include a value identifying a piece of content viewed by the user or users identified in profile ID field 902. For example, record 952-1 of profile history table 412 includes a content ID of 0246467 in content ID field 904 indicating that the user or users associated with the corresponding profile viewed the identified content.

Date field 906 may include information indicating the date the corresponding content was viewed. For example, record 952-1 indicates that the content with content ID of 0246467 was viewed on Mar. 5, 2010.

Start time field 908 may include a value indicating when viewing of the corresponding content began (e.g., 1700). Stop time field 910 may include a value indicating when viewing of the corresponding content stopped (e.g., 1730).

Returning to FIG. 4, server profile logic 422 may include logic to receive and store information regarding content viewing history and information associated with one or more users, user profiles, and/or user devices (e.g., TV 102 or STB 256). For example, server profile logic 422 may be configured to receive the viewing history of a user associated with a profile and to store the information in profile history table 412.

Correlation logic 424 may compare content (e.g., by comparing pieces of content metadata stored in metadata table 406) to generate correlation table 408. Server PPG logic 426 may analyze correlation table 408 to determine content to recommend to a user or a group of users by, for example, displaying a preferential program guide (e.g., PPG 106). Server PPG logic 426 may recommend programs for a user to watch, for example, based on information stored in profile history table 412, correlation table 408, profile table 410, metadata table 406, program guide 404, and/or VOD catalog 402.

Figure 5:
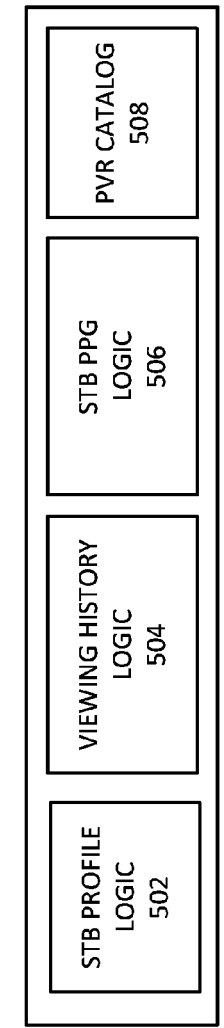
FIG. 5 is a block diagram of exemplary components of the set-top-box of FIG. 2.

FIG. 5 is a block diagram of exemplary components of STB 256 (e.g., functions performed by application 364 by processing logic 320 or stored in memory 360 of STB 256). STB 256 may include STB profile logic 502, viewing history logic 504, STB preferential program guide (PPG) logic 506, and PVR catalog 508. STB 256 may include additional or fewer components than shown in FIG. 5. Further, other devices in network 200 may include the components shown in FIG. 5, such as mobile phone 272, computer 254, or TV 102.

STB profile logic 502 may determine the users watching TV 102, for example, and their associated profiles so that STB PPG logic 506 may recommend preferred content in a preferential programming guide (e.g., PPG 106). STB profile logic 502 may determine the profiles of users by determining the user or users in front of or around TV 102, for example. In one embodiment, STB profile logic 502 may detect RFID tags carried by users (e.g., using NFC technology, Bluetooth, etc.) and associated with profiles. In another embodiment, STB profile logic 502 may detect hardware addresses associated with wireless devices (e.g., mobile phone 272) associated with users. In another embodiment, STB profile logic 502 may use a microphone or a camera and voice/face recognition software (or other biometric devices) to determine the users in front of or nearby TV 102 and their associated profiles. As yet another example, STB profile logic 502 may detect users and profiles by virtue of a user "logging in" to an account associated with a profile.

Viewing history logic 504 may include logic to capture or receive data relating to content viewed on TV 102 and/or STB 256. In one embodiment, viewing history logic 504 may be configured to capture and store information associated with content as it is viewed, e.g., on TV 102. Viewing history logic 504 may send the data relating to viewed content to, for example, profile database 216 and/or PPG server 212 for storing in profile history table 412. PVR catalog 508 may store information (e.g., metadata and/or the actual content) related to content recorded by STB 256.

STB PPG logic 506 may interact with server PPG logic 426 (in PPG server 212) to recommend content to a user. STB PPG logic 506 may receive input (e.g., instructions to record or view content) from the user regarding the recommended content.

Figure 10:
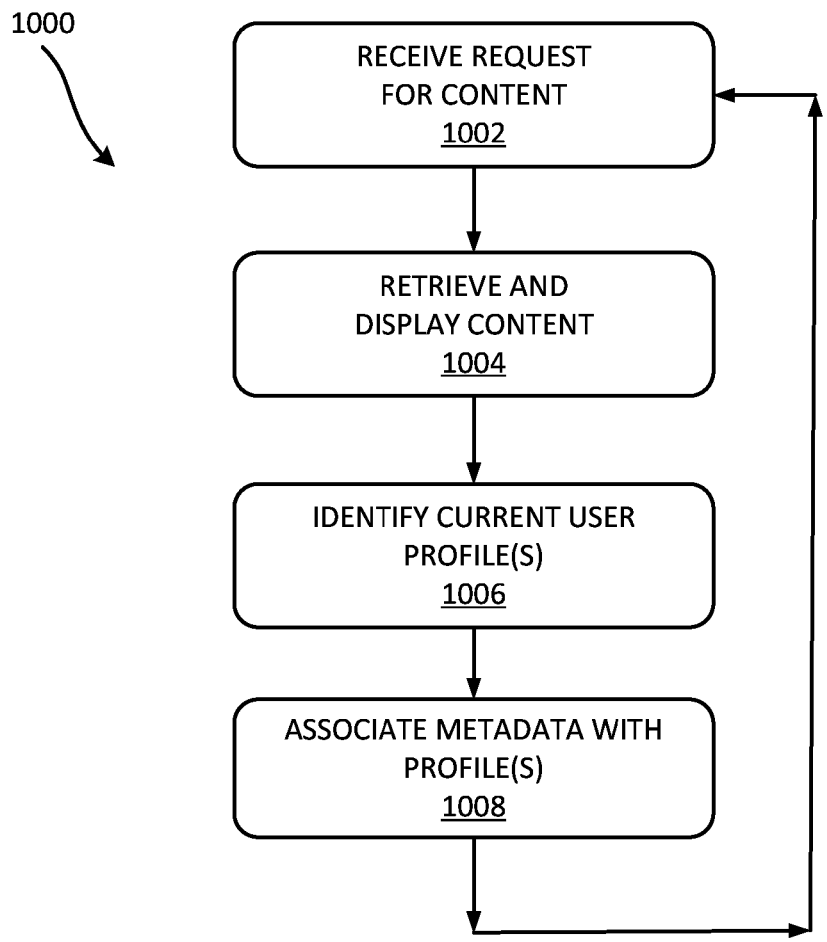
FIG. 10 is a flowchart of an exemplary process for storing data for determining user preferences.

Before recommending content by providing a preferential program guide, PPG server 212 and/or STB 256 may first learn the preferences of a user or a group of users. FIG. 10 is a flowchart of a process 1000 for storing data for determining user preferences. Process 1000 may be considered a "learning mode" of PPG server 212, STB 256, and/or TV 102, for example. Process 1000 may begin when a user or users gather around TV 102 to view or experience content. TV 102, in conjunction with STB 256, may display a program guide, similar to PPG 106 shown in FIG. 1, for example. Alternatively, TV 102 may display a generic program guide.

A request for content may be received (block 1002) from, for example, one of the users gathered around TV 102. In one example, STB 256 may receive a request for content currently playing on a particular channel (e.g., via remote 258) in response to the display of a program guide. In another embodiment, STB 256 may receive a request for content available and stored in on-demand server 232 (e.g., as cataloged in VOD catalog 402) or in a PVR associated with STB 256 as previously recorded content (e.g., as cataloged in PVR catalog 508). In yet another embodiment, the user or users may be surfing channels and may stop on a particular channel. In still another embodiment, STB 256 may receive a request for activation of a selected game or interactive application.

The requested content may be retrieved and displayed (block 1004). For example, VOD content may be retrieved from on-demand server 232 and displayed on TV 102. Or, previously recorded content may be retrieved from STB 256 and displayed on TV 102. Alternatively, content may be retrieved from national content server 222 or regional content server 234 for display on TV 102.

In one embodiment, each of the users gathering around TV 102 may be associated with a user profile. If a group has gathered around TV 102, then the group may be associated with a group profile (e.g., a family profile). The current profile (s) of the users may be identified (block 1006) and associated, for example, with the content selected in block 1002 and displayed in block 1004. In one embodiment, profile logic 502 in STB 256 may identify the profiles of users in front of or nearby TV 102. Profile logic 502 may identify the users in numerous ways. In one implementation, users may carry a device (e.g., on a keychain or in mobile phone 272) that includes an RFID tag that identifies the user. In this example, if the RFID tag is detected in front of or nearby TV 102, then the profile associated with the RFID tag may be identified as a current profile. In another embodiment, users may carry a device (e.g., a PDA or mobile phone 272) that includes a radio (e.g., a WiFi radio, a GSM radio, etc.). If a hardware address (e.g., a MAC address) of the radio is detected in front of or nearby TV 102, then the profile associated with the hardware address may be identified as a current profile. In another embodiment, profile logic 502 may use a microphone and voice recognition (or other biometric devices) to determine the users in front of or nearby TV 102. In this case, profile logic 502 may identify profiles associated with the recognized users. In yet another embodiment, profile logic 502 may use a camera and face recognition to determine the users in front of or nearby TV 102. In this case, profile logic 502 may identify profiles associated with the recognized users. As yet another example, a user may select a profile by "logging in" to an account associated with the profile.

The current user profile(s) (block 1006) may be identified continuously, on a regular basis (e.g., once every minute or once every 5, 15, 20, 25, 30, 45, or 60 minutes), or in response to certain events. For example, STB profile logic 502 may determine that John Smith's profile (e.g., ID of 56945 as shown in profile table 410) is a current profile. If John Smith is watching a program and changes to the channel to watch a different program, then the current user profile(s) (block 1006) may be detected in response to the event of changing the channel. As another example, the profile(s) may be detected continuously and, if John Smith's wife (Mary Smith) joins her husband watching TV 102, then the identified current profile(s) may include Mary Smith's profile (e.g., ID of 59678 as shown in profile table 410) as well as John Smith's profile. As another example, STB profile logic 502 may recognize that Mary and John Smith as associated with a group profile, e.g., the profile with the ID of 68297 (see FIG. 9) and may switch from John Smith's profile to the "parents" profile (or may add the "parents" profile). In yet another example, if John Smith walks away from TV 102 and Mary Smith remains in front TV 102, then the identified current profile(s) may change from John Smith's profile (or from the "parents" profile) to Mary Smith's profile (e.g., ID of 59678).

Metadata associated with the displayed content may be associated with the identified profile(s) (block 1008). For example, as described above, viewing history logic 504 may capture program guide information corresponding to the selected content and may store the captured information in profile history table 412. In addition, viewing history logic 504 may also store start and stop times associated with the viewing of the content (e.g., viewing history information).

For example, John Smith (associated with profile ID of 56945) may be viewing content with the ID of 0246467 on Mar. 5, 2010 from 17:00 to 17:30 on channel 5. This information may be recorded in profile history table 412, as shown in record 952-1 in FIG. 9. When Mary Smith (associated with profile ID of 59678) subsequently joins John Smith (both Mary and John associated with group profile ID of 68297) and both watch the same program from 17:15 to 17:30, this information may also be recorded in profile history table 412, as shown in record 952-2 and record 952-3 in FIG. 9.

Process 1000 may repeat, for example, when different content is selected for display on TV 102. STB 256 may receive a request to display different content (block 1002). The selected content may be retrieved and displayed (block 1004) and the current user profiles may be identified (block 1006). Metadata may be associated with the identified user profile(s) (block 1008). For example, STB 256 may store the stop time associated with the previous television content, e.g., in profile history table 412.

The iterative nature of process 1000 allows for server PPG logic 426 to continuously learn user preferences. User preferences may be learned from the selection of content from a preferential program guide (e.g., PPG 106), which may allow process 1000 to self correct or adjust as user preferences change. For example, if a user no longer prefers what was a favorite program, process 1000 may learn this as the user does not select the formerly favorite program even when presented in the preferential program guide. A user may also influence learned preferences by viewing the history of viewed content and deleting programs from profile history table 412. In one embodiment, a user may also influence learned preferences by marking some programs in profile history table 412 as "favorite" or "liked."

Figure 11:
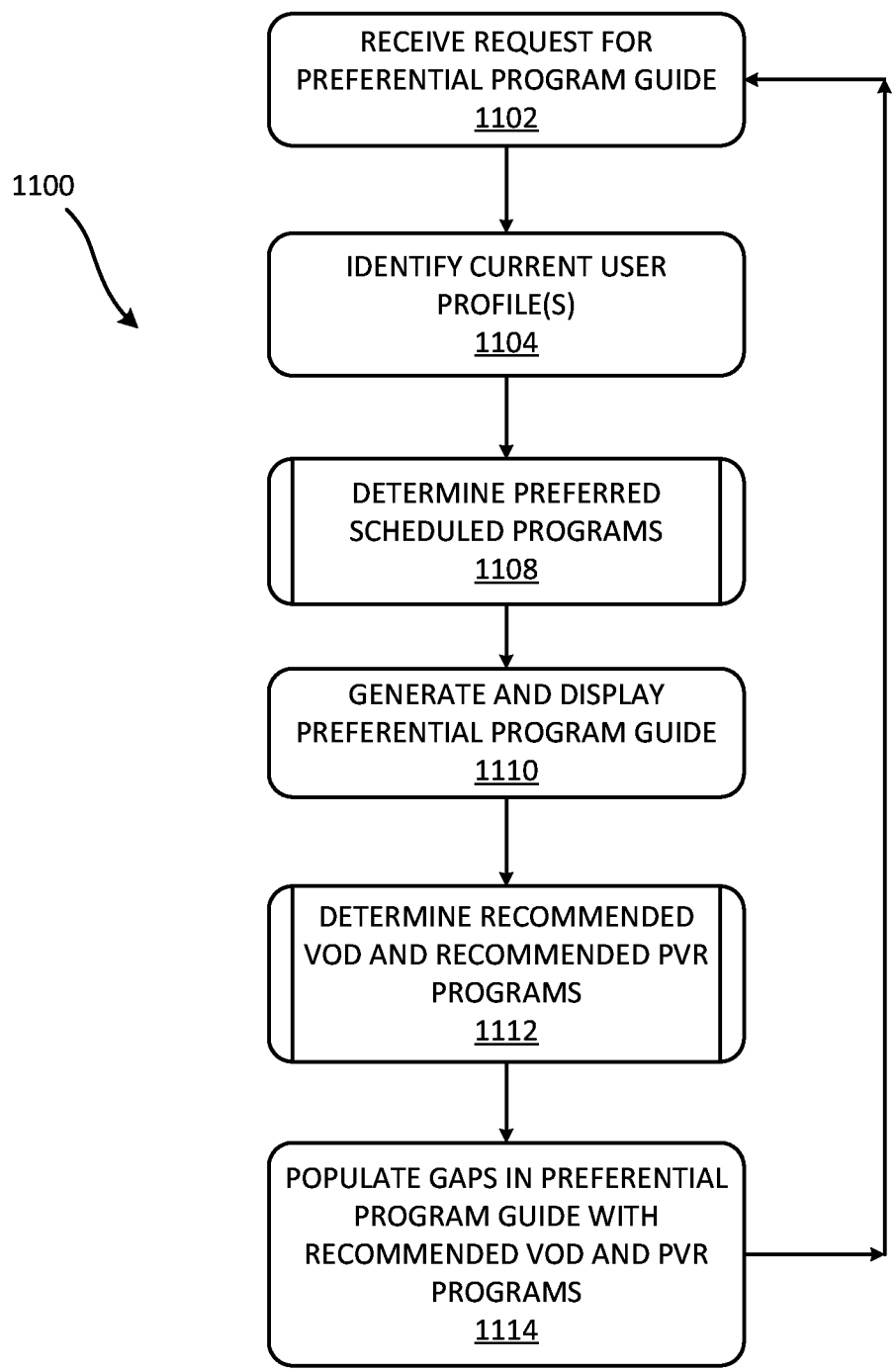
FIG. 11 is a flowchart of an exemplary process for generating a preferential program guide.

After learning user preferences in process 1000, for example, a preferential program guide (e.g., PPG 106) may be generated and displayed for users or groups of users. FIG. 11 is a flowchart of an exemplary process 1100 for generating a preferential program guide. Process 1100 may entail STB 256 and/or TV 102 using the information learned in process 1000 (e.g., learned in the "learning mode"). As with process 1000, process 1100 may begin with a user or a group of users gathering around TV 102. In one embodiment, STB PPG logic 506 and/or server PPG logic 426 may perform process 1100. A request for a preferential program guide may be received (block 1102). For example, using remote control 258, a user may navigate a menu on TV 102 to select an option to view a preferential guide.

The current user profile(s) may be identified (block 1104). As discussed above, each user or a group of users that have gathered around TV 102 may be associated with a user profile. In one example, the current profile may be determined to be the profile with an ID of 68297, which is associated with John and Mary Smith. STB profile logic 502 may, in one implementation, identify the current user profiles, as described above with respect to block 1006 of process 1000.

Preferred scheduled programs may be determined (block 1108) for the identified profile(s). In one embodiment, the programs listed in a generic program guide may be retrieved from, for example, program guide 404. In one implementation, the portion of the generic program guide relevant to the current time may be retrieved. For example, if the current time is 7:58 pm, then the generic program guide from 8 pm to midnight may be retrieved. Programs in the generic program guide may be correlated to programs in the profile history or histories associated with the identified profiles (e.g., as stored in profile history table 412). In another embodiment, programs in the generic program guide may be correlated to profile tags, for example, stored in profile tag field 806. If the correlation is greater than a threshold value, for example, then the program may be recommended to the users associated with the profile. An exemplary process for determining recommended scheduled programs is discussed below with respect to FIG. 14A.

Figure 12:
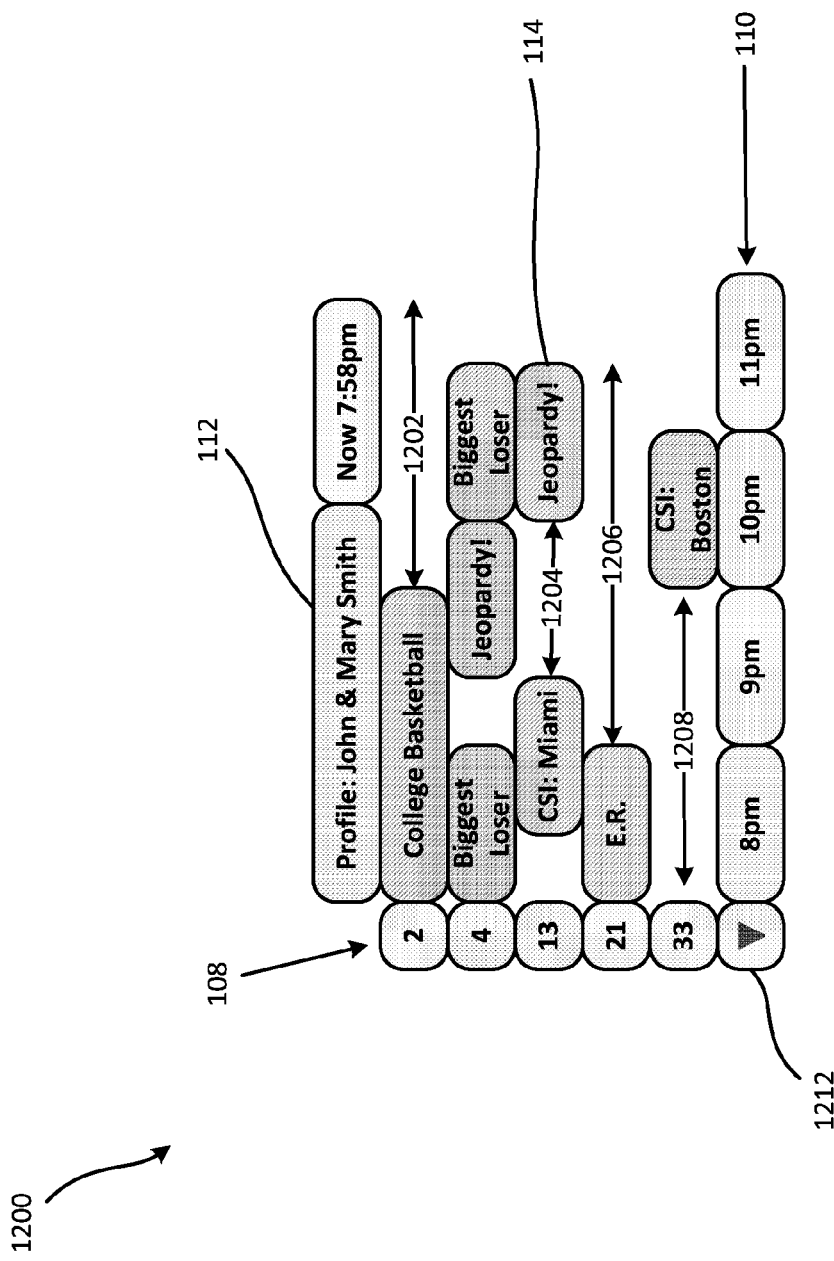
FIGS. 12 and 13 are diagrams of exemplary preferential program guides.

The preferential program guide may be generated and displayed (block 1110) to the user. FIG. 12 is a diagram of an exemplary preferential program guide (PPG) 1200. As shown, PPG 1200 includes programs that are preferred by John and Mary Smith, as identified in graphical box 112. PPG 1200, however, may include gaps (e.g., time gaps 1202, 1204, 1206, and 1208). As shown in PPG 1200, for example, a timeline for channel 2 indicates that "College Basketball" is scheduled to broadcast between 8 pm and 10 pm on channel 2. The timeline for channel 2 then includes gap 1202 from 10 pm through 12 am, indicating programming during that time on channel 2 that is not recommended for viewing by the users associated with the current profile (e.g., John and Mary Smith). In one embodiment, rather than entirely eliminating non-recommended programs from a preferential programming guide, non-recommended programs may be shaded or be presented in a different color.

PPG 1200 also includes a timeline for channels 4, 13, 21, and 33. PPG 1200 also includes a graphical widget 1212 that, when selected by the user, may display timelines for other additional channels (e.g., channels higher than channel 33). In this embodiment, PPG 1200 may omit channels that do not have any scheduled recommended content.

In one embodiment, time gaps 1202-1208 may be filled by other content, such as VOD content and/or PVR content. In this embodiment, recommended VOD programs and recommended PVR programs may be determined (block 1112). Programs in VOD catalog 402 and PVR catalog 508 may be correlated to programs in the profile history. If the correlation is greater than a threshold value, for example, then the VOD program and/or PVR program may be displayed in the preferential program guide.

Figure 13:
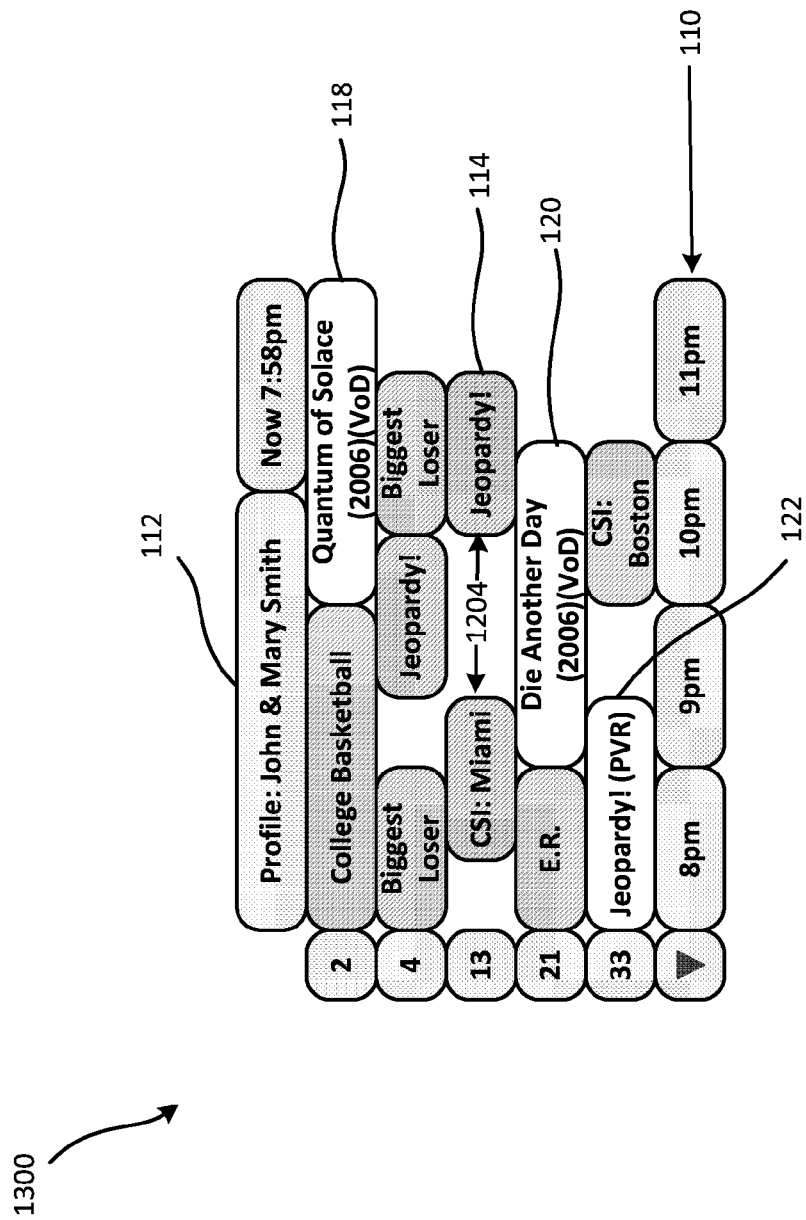

Gaps in the preferential program guide may be filled with recommended VOD and/or recommended PVR programs (block 1114). FIG. 13 is a diagram of an exemplary preferential program guide 1300. As shown in FIG. 13, PPG 1300 includes a VOD program 118 in the timeline for channel 2 (e.g., Quantum of Solace from 10 pm to 11 pm) and a VOD program 120 in the timeline for channel 21 (e.g., Die Another Day from 9 pm to 11 pm). PPG 1300 also includes a PVR program 122 in the timeline for channel 33 (e.g., Jeopardy! from 8 pm to 9:30 pm). In exemplary PPG 1300, recommended VOD and PVR programs may be presented in a different color and/or may include "PVR" or "VOD" labels, so as not to confuse the user that those programs are offered on the corresponding channels. Rather, with VOD and PVR programs in different colors or with labels, the user may understand that these are recommended viewing time slots for the recommended content. In one embodiment, PVR content may be recommended in a PPG on the channel from which it was recorded.

Figures 14A, 14B:
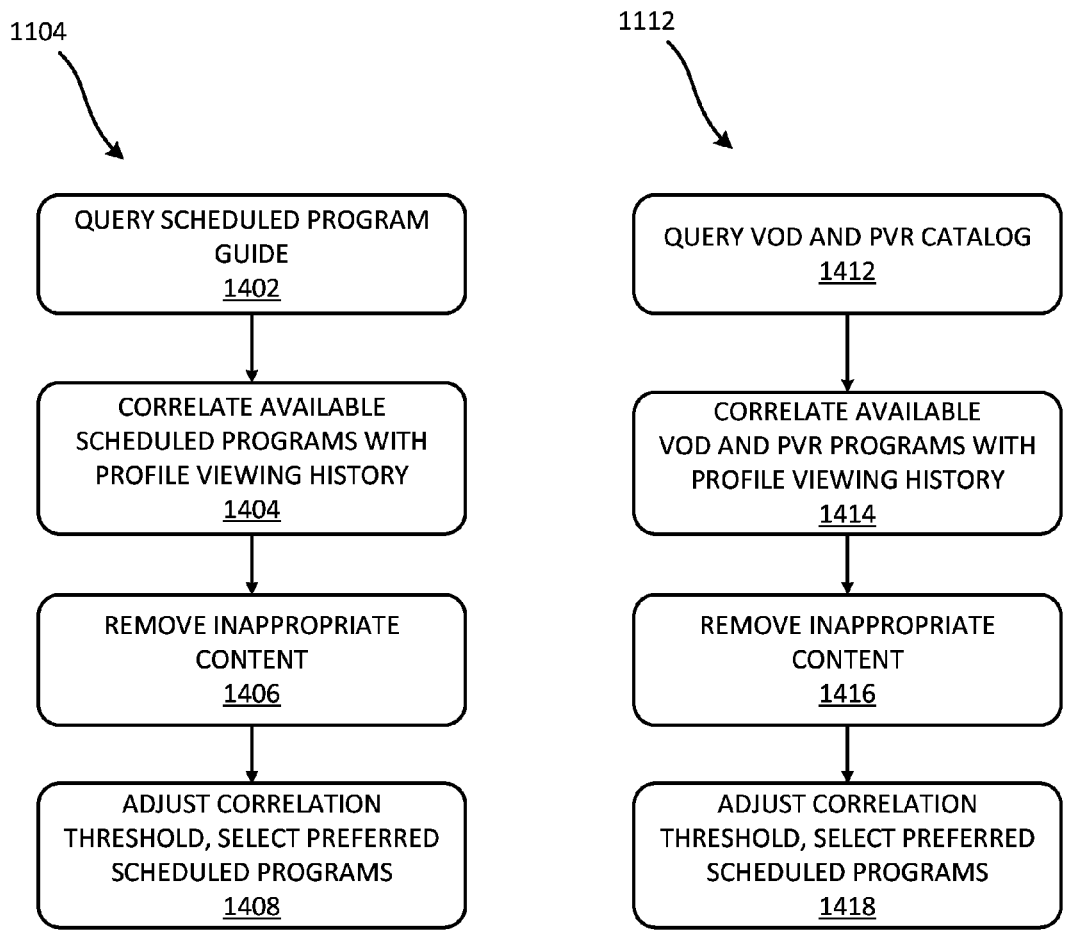
FIG. 14A is a flowchart of an exemplary process for determining preferred or recommended content from a scheduled program guide.
FIG. 14B is a flowchart of an exemplary process for determining or recommending preferred content from a video-on-demand or a personal video recorder program catalog.

FIG. 14A is a flowchart of an exemplary process 1104 for recommending or determining preferred content from a scheduled program guide. Process 1104 may begin when a user or users gather around TV 102 and select an option to view a preferred program guide. The scheduled program guide may be queried (block 1402) with respect to the appropriate time frame, for example, for available content.

The available scheduled content may be correlated with the content previously viewed by the user or users (block 1404). For example, metadata table 406 may describe the programs previously watched and associated with the identified current profile (as stored in profile history table 412). Further, metadata table 406 may also describe the available scheduled programs in a given time frame (e.g., in the next two hours as scheduled in program guide 404). Correlating may include determining whether metadata associated with available scheduled content includes phrases (or stemmed phrases) that match phrases (or stemmed phrases) in metadata of previously viewed content (as stored in profile history table 412). Such a correlation may proceed field by field, for example, and result in correlation table 408.

Correlating may also consider the time of the previously viewed content. For example, programs viewed two years ago may not be given as much weight as programs viewed two weeks ago, all else being equal. Correlating may include comparing available scheduled content with preferred categories of content specified in the current profile. For example, if the current profile ID is 98973 and an available program includes material about camping, than the correlation score for that available program may be increased because the profile type associated with the current profile includes "camping."

Inappropriate content may be removed (block 1406). For example, if the current profile has an ID of 98562 (e.g., record 852-5 labeled "kids" for Jane and Martin Smith), then any content that is not appropriate for children may be removed.

The correlation threshold may be adjusted and the preferred scheduled programs may be selected (block 1408). For example, if a high correlation threshold results in too few programs being recommended, then the threshold may be lowered. If, on the other hand, a low correlation threshold results in too many programs being recommended, then the threshold may be raised. In one embodiment, the threshold may be set or changed by the user. For example, if the user believes that the recommended content is cluttered with too many uninteresting programs, then the user may increase the correlation threshold to reduce the number of recommended programs.

FIG. 14B is a flowchart of an exemplary process 1112 for recommending or determining preferred content from a VOD and/or PVR program catalog. Process 1112 may begin when a user or users gather around TV 102 and select an option to view a preferred program guide. The VOD and/or PVR program catalog may be queried (block 1412) for available content, for example.

The available VOD and PVR content may be correlated with the content previously viewed as recorded in the current profile (block 1414). For example, metadata table 406 may describe the programs previously watched and associated with the current identified profile (and recorded in profile history table 412). Further, metadata table 406 may also describe the available PVR and VOD programs (as cataloged in PVR catalog 508 and/or VOD catalog 402). Correlating may include determining whether the available PVR and VOD content includes phrases (or stemmed phrases) that match phrases (or a stemmed phrases) in the metadata of the previously viewed content. Such a correlation may proceed field by field, for example, and result in correlation table 408. Correlating may include comparing available PVR and VOD content with preferred categories of content specified in the current profile. For example, if the current profile ID is 98973 and an available program includes material about camping, than the correlation score for that available program may be increased because the profile type associated with the current profile includes "camping."

Inappropriate content may be removed (block 1416). For example, if the current profile has an ID of 98562 (e.g., record 852-5 labeled "kids" for Jane and Martin Smith), then any content that is not appropriate for children may be removed. As another example, if the current profile is 59678 (e.g., the profile for Mary Smith) and the available content includes a football program, then that program may be excluded as inappropriate because the profile type 806 specifies "no football."

The correlation threshold may be adjusted and the preferred scheduled programs may be selected (block 1418). For example, if a high correlation threshold results in too few VOD and/or PVR programs from being recommended, then the threshold may be lowered. If, on the other hand, a low correlation threshold results in too many programs being recommended, then the threshold may be raised. In one embodiment, the threshold may be set or changed by the user. For example, if the user believes that the recommended content is cluttered with too many uninteresting programs, then the user may increase the correlation threshold to reduce the number of recommended programs. In one embodiment, VOD and/or PVR programs may be selected based on the length of the programs and the available gaps in the PPG generated in process 1108.

Figure 15:
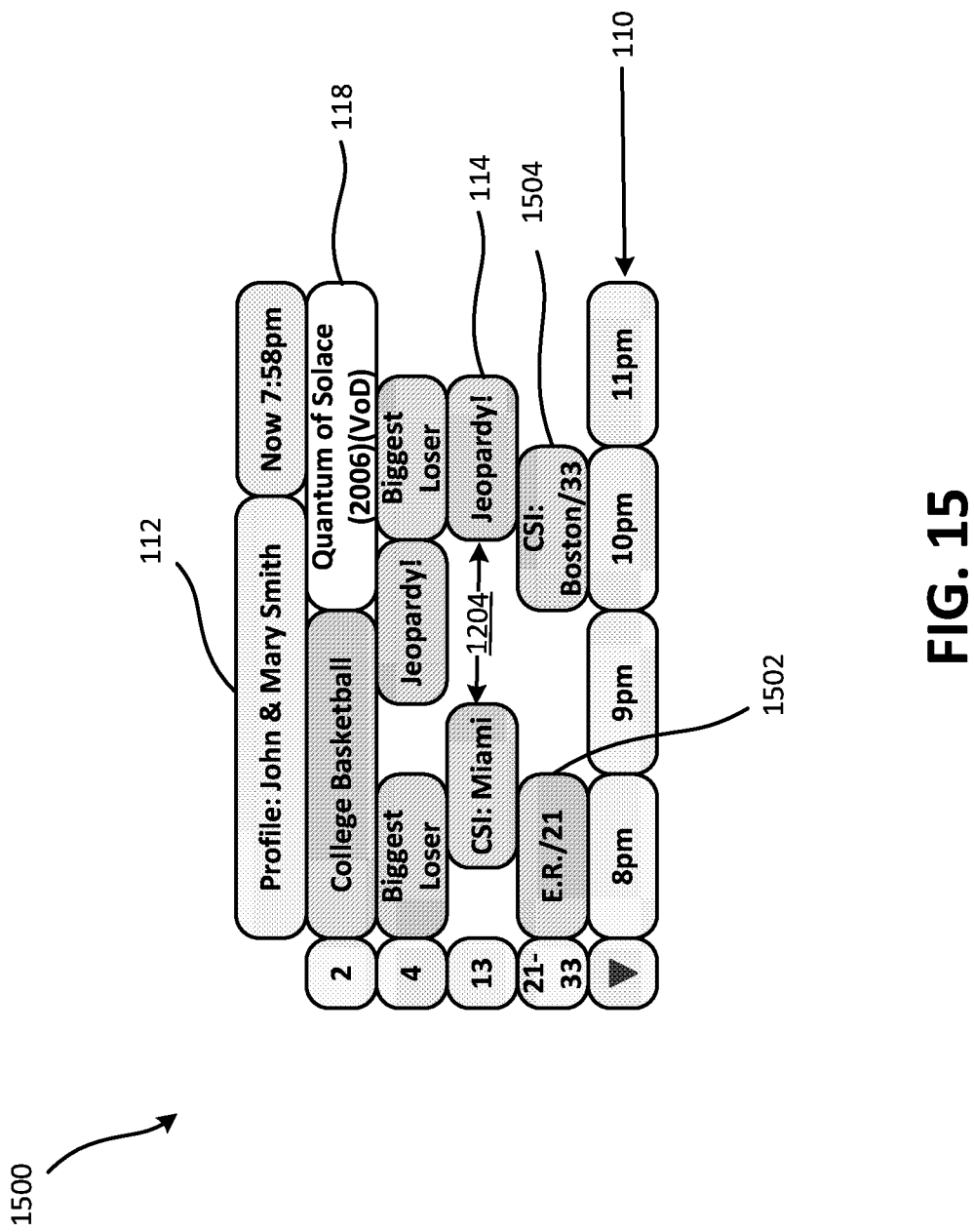
FIG. 15 is a diagram of an exemplary preferential program guide.

FIG. 15 is a block diagram of an exemplary preferential program guide (PPG) 1500. PPG 1500 includes information similar to the information in PPG 1200. As discussed above with respect to PPG 1200, the timeline for channel 21 includes time gap 1206 and the timeline for channel 33 includes a time gap 1208. In PPG 1500, gaps 1206 and/or 1208 may be reduced by collapsing the timeline for channel 21 into the timeline for channel 33. Thus, PPG 1500 includes one timeline for channels 21-33. In this embodiment, the channel number for programs may be displayed with the program title (e.g., "E.R./21" and "CSI: Boston/33"). In PPG 1500, like PPG 1300, time gap 1202 is filled with VOD program 118 (e.g., Quantum of Solace).

Embodiments other than those described above are possible. For example, with respect to process 1000, content may be displayed (block 1004) on any device in network 200, including mobile device 272 or computer 254, and metadata may be associated with the appropriate profiles (block 1008). With respect to process 1100, a request for a preferential program guide (block 1102) may be received from any device in network 200, such as mobile device 272, computer 254, or TV 102. The preferential program guide may also be displayed on any device in network 200, such as mobile device 272, computer 254, or TV 102. Further, with respect to process 1100, if multiple profiles are identified (block 1104) and no common group profile is identified, for example, then process 1100 may determine preferred scheduled programs (block 1108) for each profile independently for generating and displaying the preferential program guide (block 1110). Process 1100 may also determine recommended VOD and PVR programs (block 1112) for each profile independently and may intersect the sets of determined recommended POV and PVR programs for populating gaps in the preferential program guide (block 1114).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

While series of blocks have been described above with respect to different processes, the order of the blocks may differ in other implementations. Moreover, non-dependent acts may be performed in parallel.

It will be apparent that aspects of the embodiments, as described above, may be implemented in many different forms of software, firmware, and hardware in the embodiments illustrated in the figures. The actual software code or specialized control hardware used to implement these embodiments is not limiting of the invention. Thus, the operation and behavior of the embodiments of the invention were described without reference to the specific software code—it being understood that software and control hardware may be designed to the embodiments based on the description herein.

Further, certain portions of the invention may be implemented as logic that performs one or more functions. This logic may include hardware, such as an application specific integrated circuit, a field programmable gate array, a processor, or a microprocessor, or a combination of hardware and software.

No element, act, or instruction used in the description of the present application should be construed as critical or essential to the invention unless explicitly described as such. Also, as used herein, the articles "a" and the term "one of" are intended to include one or more items. Further, the phrase "based on" is intended to mean "based, at least in part, on" unless explicitly stated otherwise.

What is claimed is:

1. A computer-implemented method comprising:
   selecting, by a processor, a plurality programs to recommend to a user based on preferences of the user;
   displaying a program guide including a timeline on a display,
      wherein the program guide indicates times that the plurality of recommended programs are scheduled to broadcast and one or more channels on which the plurality of recommended programs are scheduled to broadcast,
      wherein the program guide includes a gap between two of the displayed recommended programs, the gap indicating a time during which one or more programs not selected to recommend to the user is scheduled to broadcast, wherein the two displayed recommended programs are scheduled to broadcast on a specific channel of the one or more channels; and
   displaying, on the display, information identifying a personal video recorder (PVR) program in the gap between the two of the displayed recommended programs, wherein the PVR program was previously recorded from the specific channel and is not scheduled to broadcast at the indicated time.

2. The computer-implemented method of claim 1, further comprising:
   displaying the two of the recommended programs in a row,
   displaying an indication of the specific channel on which the two of the recommended programs are scheduled to broadcast and from which the PVR program was previously recorded,
   wherein the row does not display programs scheduled to broadcast on channels other than the specific channel.

3. The computer-implemented method of claim 2, further comprising selecting, by the processor, the PVR program based on one or more programs previously viewed by the user.

4. The computer-implemented method of claim 3, wherein selecting the PVR program includes querying a PVR catalog to determine that the PVR program is available by the user.

5. The computer-implemented method of claim 1, wherein a plurality of channels are associated with the plurality of recommended programs, wherein displaying the program guide includes displaying, on the display, a timeline for each of the plurality of channels.

6. The computer-implemented method of claim 5, wherein selecting the plurality of programs to recommend includes querying a program guide to determine that the recommended program is scheduled to broadcast within a period of time in the future.

7. The computer-implemented method of claim 1, wherein the preferences of the user are based on one or more programs previously viewed by the user or a type of program preferred by the user.

8. The computer-implemented method of claim 7,
   wherein selecting the plurality of programs includes selecting a program from a list of scheduled programs based on a correlation between the one or more programs previously viewed by the user with each of the one or more programs in the list of scheduled programs, wherein the correlation of each of the selected plurality of programs exceeds a threshold, wherein the selected plurality of programs is a first number of programs, the method further comprising:
   receiving an input from the user to increase the threshold to generate an increased threshold;
   selecting a new plurality of programs to recommend to the user based on the preferences of the user and the increased threshold, wherein the new plurality of programs is a second number of programs, and wherein the first number is greater than the second number; and
   displaying the program guide based on the selection of the new plurality of programs.

9. The computer-implemented method of claim 8, wherein the threshold is a first threshold, the method further comprising:
   correlating the one or more programs previously viewed by the user with each of the one or more programs in the list of scheduled programs, wherein correlating comprises correlating metadata describing the one or more programs previously viewed with metadata describing the one or more programs in the list of scheduled programs,
   wherein selecting the plurality of programs includes selecting the PVR program from a list of PVR programs based on a correlation between the one or more programs previously viewed by the user with each of the one or more programs in the list of PVR programs, wherein the correlation of the selected PVR program exceeds a second threshold different than the first threshold.

10. A system comprising:
   a network device comprising:
      a processor to select a plurality programs to recommend to a user based preferences of the user, wherein the processor is configured to select the plurality of recommended programs from a list of scheduled programs based on a correlation between one or more programs previously viewed by the user and each of the programs in the list of scheduled programs, wherein the correlation of each of the selected plurality of programs exceeds a user-adjustable threshold;
      a transmitter to send a program guide including a timeline to a video client for display, wherein the program guide indicates times that the plurality of recommended programs are scheduled to broadcast, wherein the program guide includes a gap between two of the displayed recommended programs, the gap indicating a time during which one or more programs not selected to recommend to the user is scheduled to broadcast, wherein the two displayed recommended programs are scheduled to broadcast on a specific channel of one or more channels, and wherein the program guide includes a personal video recorder (PVR) program in the gap between the two displayed recommended programs, wherein the PVR program is not scheduled to broadcast at the indicated time and was previously recorded from the specific channel; and a receiver to receive input from the user to adjust the user-adjustable threshold, wherein the processor is configured to reselect the plurality of recommended programs from the list of scheduled programs and the transmitter is configured to retransmit the program guide to the video client for display when the receiver receives the input from the user to adjust the user-adjustable threshold.

11. The system of claim 10, further including the video client, a camera, and facial recognition logic, wherein the facial recognition logic is configured to receive images from the camera to identify the user in front of the camera and associate the one or more programs being played by the video client and viewed by the user with a profile associated with the user.

12. The system of claim 11, wherein the processor is configured to select the PVR program based on one or more programs previously viewed by the user.

13. The system of claim 12, wherein the processor is configured to query a PVR catalog to determine that the PVR program is available by the user.

14. The system of claim 13, further comprising a memory to store a database including a guide of scheduled programs, and a memory to store a catalog of PVR programs.

15. The system of claim 10,
wherein a plurality of channels are associated with the plurality of recommended programs, and
wherein the program guide includes a timeline for each of the plurality of channels.

16. The system of claim 15, further comprising a user device, the user device including:
a receiver to receive the program guide from the network device; and
a display to display the program guide.

17. The system of claim 10, wherein the processor is configured to querying a guide of scheduled programs to determine that the plurality of recommended programs are scheduled to broadcast within a period of time in the future.

18. The system of claim 10,
wherein the receiver is configured to receive an increased threshold from the user as the user-adjustable threshold, wherein the processor is configured to reselect the plurality of recommended programs from the list of scheduled programs based on correlations between the one or more programs previously viewed by the user and the programs in the list of scheduled programs, and
wherein the correlation of each of the reselected plurality of programs exceeds the increased threshold and wherein the selected plurality of programs outnumber the reselected plurality of programs.

19. The system of claim 10, wherein the preferences of the user are based on one or more programs previously viewed by the user or based on a type of program preferred by the user.

20. The system of claim 19, wherein the processor is configured to correlate metadata describing the one or more programs previously viewed with metadata describing the one or more programs in the list of scheduled programs.

21. A device comprising:
a display to display a program guide, wherein the program guide includes a plurality programs recommend for a user based preferences of the user,
wherein the program guide indicates times that the plurality of recommended programs are scheduled to broadcast and one or more channels on which the plurality of recommended programs are scheduled to broadcast,
wherein the program guide includes a gap between two of the displayed recommended programs, the gap indicating a time during which one or more programs not selected to recommend to the user is scheduled to broadcast,
wherein the two of the displayed recommended programs are associated with a specific channel of the one or more channels on which the two displayed recommend programs are scheduled to broadcast,
wherein information identifying a personal video recorder (PVR) program is displayed on the display in the gap between the two of the displayed recommended programs, and
wherein the PVR program was previously recorded from the specific channel and is not scheduled to broadcast at the indicated time.

22. The device of claim 21,
wherein the two of the displayed recommended programs are displayed in a row,
wherein an indication is displayed of the specific channel on which the two of the recommended programs are scheduled to broadcast and from which the PVR program was previously recorded,
wherein the row does not display programs scheduled to broadcast on channels other than the specific channel.

23. The device of claim 21, wherein a plurality of channels are associated with the plurality of recommended programs, and wherein the program guide includes a timeline for each of the plurality of channels.

24. The device of claim 21, wherein the preferences of the user are based on one or more programs previously viewed by the user or a program type preferred by the user.

25. The method of claim 9 further comprising:
receiving an input from the user to lower the second threshold to generate a lowered threshold;
reselecting a plurality of PVR programs to recommend to the user based on the preferences of the user and the lowered threshold; and
displaying the program guide based on the reselection of the plurality of PVR programs.

* * * * *